United States Patent
Ho

(10) Patent No.: US 7,503,672 B2
(45) Date of Patent: Mar. 17, 2009

(54) BACK LIGHT MODULE AND LIGHT MIXING APPARATUS THEREOF

(75) Inventor: Chung-Hsing Ho, Fongshan (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 71 days.

(21) Appl. No.: 11/355,633

(22) Filed: Feb. 15, 2006

(65) Prior Publication Data
US 2007/0189009 A1 Aug. 16, 2007

(51) Int. Cl.
*F21V 1/00* (2006.01)
(52) U.S. Cl. ............... 362/240; 362/225; 362/235; 362/242; 362/346; 362/555
(58) Field of Classification Search ............ 362/225, 362/227, 240, 242, 561, 606, 235, 298, 346, 362/555, 560, 290, 307, 341, 800
See application file for complete search history.

(56) References Cited
U.S. PATENT DOCUMENTS

| | | | | |
|---|---|---|---|---|
| 5,381,309 A | * | 1/1995 | Borchardt | 362/612 |
| 5,819,454 A | * | 10/1998 | Rosenitsch | 40/452 |
| 6,234,648 B1 | * | 5/2001 | Borner et al. | 362/235 |
| 6,654,088 B2 | * | 11/2003 | Morishita et al. | 349/113 |
| 2004/0218390 A1 | * | 11/2004 | Holman et al. | 362/245 |
| 2005/0195619 A1 | * | 9/2005 | Tseng | 362/561 |
| 2006/0285311 A1 | * | 12/2006 | Chang et al. | 362/97 |
| 2007/0041186 A1 | * | 2/2007 | Tan et al. | 362/240 |
| 2007/0103908 A1 | * | 5/2007 | Tabito et al. | 362/294 |

FOREIGN PATENT DOCUMENTS

| | | |
|---|---|---|
| JP | 09-146089 | 6/1997 |
| JP | 11-085075 | 3/1999 |

* cited by examiner

*Primary Examiner*—Sandra L O'Shea
*Assistant Examiner*—Mary Zettl
(74) *Attorney, Agent, or Firm*—J.C. Patents

(57) ABSTRACT

A light mixing apparatus including a bottom plate, a plurality of lateral walls, a reflection structure and a plurality of side emitting type LEDs is provided. The bottom plate is connected to the lateral walls. Moreover, each lateral wall has an inner surface and the inner surface face each other. The side emitting type LEDs mentioned are disposed on the bottom plate and the reflecting structure is disposed on the inner surface of the lateral wall.

25 Claims, 6 Drawing Sheets

BACK LIGHT MODULE AND LIGHT MIXING APPARATUS THEREOF

BACKGROUND OF THE INVENTION

1. Field of Invention

The present invention relates to a back light module, and more particularly to a light mixing apparatus applicable to a back light module.

2. Description of Related Art

With the benefit of advance of development in manufacturing semiconductor elements or display devices, the multimedia technology at present reaches a very high level. With respect to display devices, liquid crystal displays with the advantages of high picture quality, compactness, low power consumption, free radiation and the like have become a mainstream in the market.

Since the LCD panel itself does not have a light emitting function, a back light module must be disposed under it to provide a planar light source for the LCD panel. As the LED has the advantages of high brightness, low power consumption, long life span, less thermal-dissipated problems and the like, an LED array has been widely used in the back light module nowadays.

FIG. 1 is a schematic sectional view of a conventional back light module, and FIGS. 2A and 2B are a schematic view of the light emitting shape of a side emitting type LED, respectively. Referring to FIGS. 1 and 2A first, the bottom lighting type back light module 110 mostly employs a side emitting type LED 100 shown in FIG. 2A as a light emitting source, and the side emitting type LED 100 can convert a point light source into a plane diffusing light source through lens (not shown) of its own package structure. That is to say, most of the light emitted by the side emitting type LED 100 is converged in the region A1 on both sides.

In the back light module 110, a diffusion plate 120 is disposed above the array formed by side emitting type LEDs 100. When the back light module 110 is lit, the light emitted by the side emitting type LEDs 100 at different positions will be sent out through the diffusion plate 120 after being mixed, thereby forming a planar light source with uniform brightness.

It should be noticed that if the distance between the diffusion plate 120 and the side emitting type LEDs 100 is much small, the light provided by the back light module may not be mixed uniformly. To provide enough distance for mixing the light emitted by the side emitting type LEDs 100, the current implemented method is to enlarge the distance between the diffusion plate and the side emitting type LEDs 100. However, this method will increase the overall thickness of the back light module, which is contradictory to the light-and-thin design trend of the back light module.

Referring to FIGS. 1 and 2B, in the back light module 110, colors are most likely to be mixed non-uniformly at an edge of the array formed by side emitting type LEDs 100. As the red side emitting type LED 100R, blue side emitting type LED 100B and green side emitting type LED 100G are separated from each other by a pitch respectively, the illumination range of each side emitting type LED (100R, 100G and 100B) is limited, and only the light emitted by the green side emitting type LED 100G adjacent to the edge can reach the region A2, thus causing a non-uniformly-mixed light in the region A2 and accordingly the occurrence of an apparent single-color (green) cast phenomenon. Therefore, the conventional back light module 110 cannot provide the uniformly mixed light, thereby deteriorating the display quality of LCDs.

SUMMARY OF THE INVENTION

An object of the present invention to provide a light mixing apparatus to solve the conventional problem of the non-uniformly-mixed light emitted by a back light module.

Another object of the present invention to provide a back light module to solve the conventional problem that the uniformly-mixed light cannot be improved unless the overall thickness of the back light module is increased.

To achieve the aforementioned or other objects, the present invention proposes a light mixing apparatus including a bottom plate, a plurality of lateral walls, a reflection structure and a plurality of side emitting type LEDs. The bottom plate is connected to the lateral walls. Each lateral wall has an inner surface and the inner surfaces face each other. The side emitting type LEDs mentioned above are disposed on the bottom plate and the reflection structure is disposed on the inner surface of the lateral wall.

In a light mixing apparatus according to an embodiment of the present invention, the above-mentioned inner surface of each lateral wall has a lateral diffusion region, and the reflection structure exposes the lateral diffusion regions.

In a light mixing apparatus according to an embodiment of the present invention, the aforementioned lateral diffusion regions can be disposed above the reflection structure.

In a light mixing apparatus according to an embodiment of the present invention, the aforementioned bottom plate has a diffusion surface, and the side emitting type LEDs can be disposed on the diffusion surface.

In a light mixing apparatus according to an embodiment of the present invention, an upper diffusion plate above the lateral walls is further included.

In a light mixing apparatus according to an embodiment of the present invention, the aforementioned upper diffusion plate and the upper edge of the lateral walls are separated by a pitch.

In a light mixing apparatus according to an embodiment of the present invention, the aforementioned reflection structure includes a plurality of micro-reflecting elements.

In a light mixing apparatus according to an embodiment of the present invention, the aforementioned micro-reflecting elements are a plurality of micro lenses.

In a light mixing apparatus according to an embodiment of the present invention, the aforementioned reflection structure comprises a wedge-shaped reflecting plate.

In a light mixing apparatus according to an embodiment of the present invention, a transparent plate is further included, which is disposed between the lateral walls and above the aforementioned side emitting type LEDs. A light emitted by the side emitting type LEDs is suitable to be reflected onto the transparent refractive plate by the reflection structure.

In a light mixing apparatus according to an embodiment of the present invention, the material of the aforementioned transparent refractive plate is, for example, polymethyl methacrylate (PMMA).

In a light mixing apparatus according to an embodiment of the present invention, the upper edge of each aforementioned lateral wall, unconnected to the bottom plate, is provided with a sharp portion.

In a light mixing apparatus according to an embodiment of the present invention, the aforementioned side emitting type LEDs include red side emitting type LEDs, green side emitting type LEDs, blue side emitting type LEDs or any combination thereof.

The present invention proposes a back light module including an outer frame and a plurality of aforementioned light mixing apparatuses, and the light mixing apparatuses are disposed within the outer frame.

In a back light module according to an embodiment of the present invention, the aforementioned light mixing apparatuses are adjacent to each other and arranged within the outer frame in an array.

A reflection structure is provided on the lateral walls of the light mixing apparatus according to the present invention, so the light emitted by the side emitting type LEDs can be reflected several times within the light mixing apparatus to enhance the mixing uniformity of light. Therefore, the light can be mixed more uniformly by using the back light module implementing the light mixing apparatus of the present invention.

In order to the make the aforementioned and other objects, features and advantages of the present invention comprehensible, a preferred embodiment accompanied with figures is described in detail below.

DESCRIPTION OF EMBODIMENTS

The light mixing apparatus of the present invention can be used in the back light module of the LCDs. Several embodiments of the light mixing apparatus according to the present invention will be given in the following, and then how to form a back light module with the light mixing apparatus of the present invention will be further explained.

First Embodiment

Figure 1:
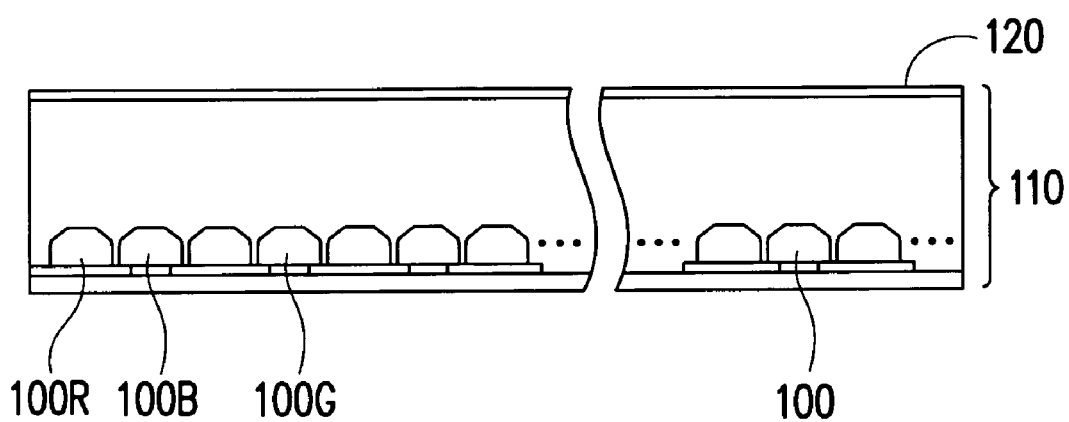
FIG. 1 depicts a schematic sectional view of a conventional back light module.
Figure 2A:
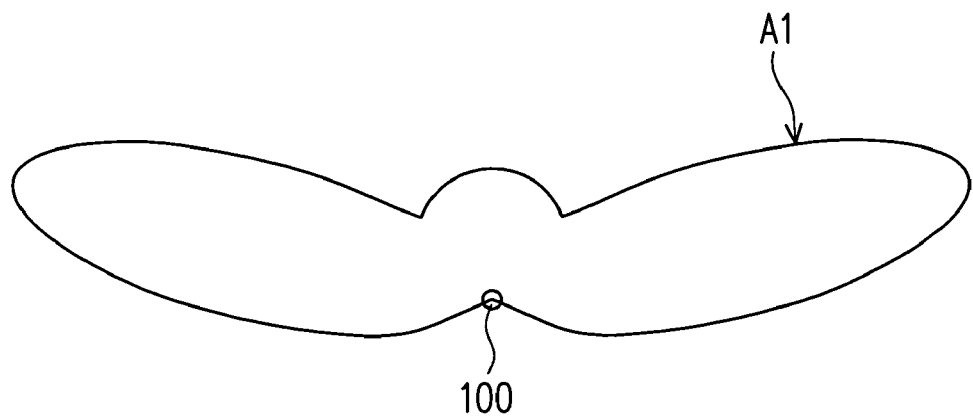
FIGS. 2A and 2B depict a schematic view of the light emitting shape of a side emitting type LED respectively.
Figure 2B:
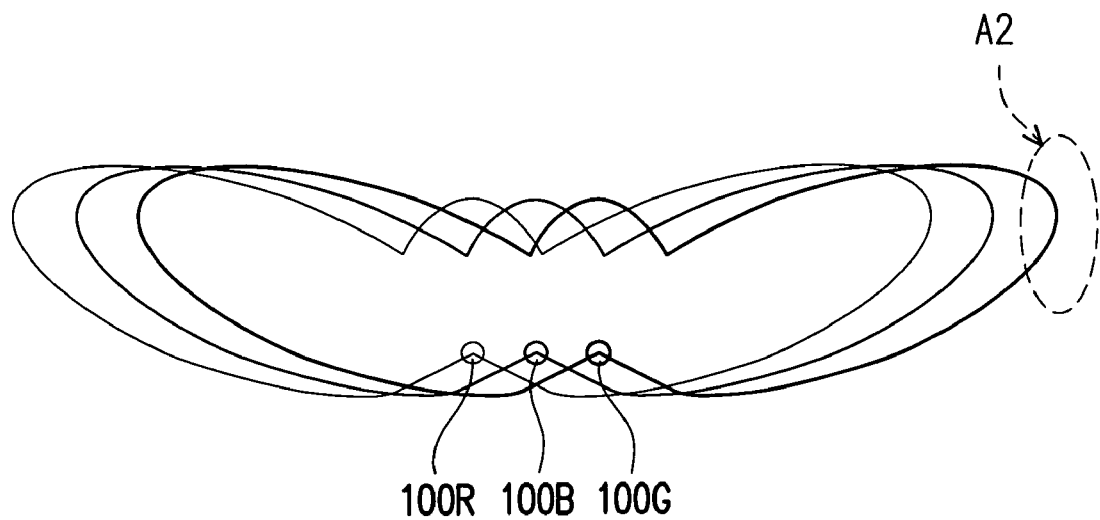
Figure 3:
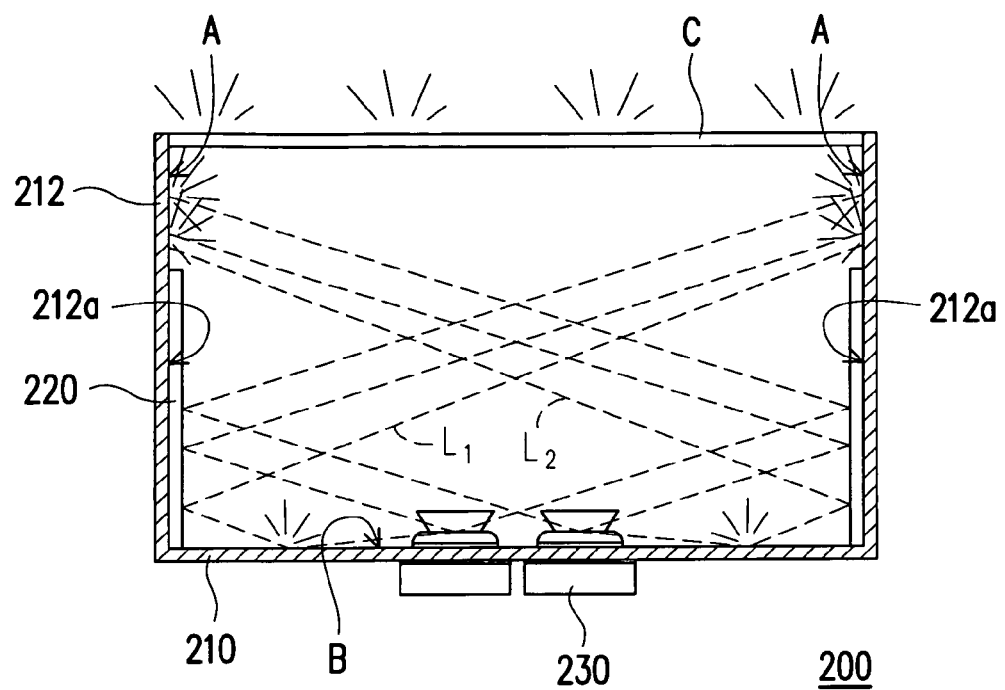
FIG. 3 depicts a schematic sectional view of a light mixing apparatus according to the first embodiment of the present invention.

FIG. 3 depicts a schematic sectional view of a light mixing apparatus according to the first embodiment of the present invention. Referring to FIG. 3, the light mixing apparatus 200 of the present invention includes a bottom plate 210, a plurality of lateral walls 212, a reflection structure 220 and a plurality of side emitting type LEDs 230. The bottom plate 210 is connected to the lateral walls 212 and the bottom plate 210 can be integrated with the lateral walls 212.

It should be noted that the light emitting source implemented by the light mixing apparatus 200 of the present invention is the side emitting type LEDs 230 disposed on the bottom plate 210. In general, there are, for example, nut holes or through holes (not shown) in the bottom plate 210, and the side emitting type LEDs 230 are, for example, embedded in the nut holes or through holes. The side emitting type LEDs 230 can be red side emitting type LEDs, green side emitting type LEDs or blue side emitting type LEDs.

In the full-color display technology, the light mixing apparatus 200 can employ red side emitting type LEDs, green side emitting type LEDs and blue side emitting type LEDs at the same time to display a color picture. Since the brightness of the color light emitted by side emitting type LEDs of different colors may be different, the side emitting type LEDs of different kinds can be disposed on the bottom plate 210 in different proportions to achieve different light mixing effects according to the requirement by display brightness of the integral light mixing apparatus 200. Of course, those skilled in the art can adjust the color and the number of the side emitting type LED 230 disposed on the bottom plate 210 according to the practical demand to achieve the desired color or brightness.

Referring to FIG. 3 again, each lateral wall 212 mentioned above has an inner surface 212a, and the inner surfaces 212a face each other. It should be noted that the reflection structure 220 mentioned above is disposed on the inner surfaces 212a of the lateral walls 212; that is, the reflection structure 220 is positioned on the sides of the side emitting type LEDs 230. As the light mixing apparatus 200 of the present invention employs the side emitting type LEDs 230 as its light emitting source, most of the emitted light is transmitted to the reflection structure 220. As such, the light emitted by each side emitting type LED 230 (for example, light L1 and light L2) can be reflected several times between the lateral walls 212 to achieve a uniformly light mixing effect.

Generally, to uniformly mix the light emitted by the light mixing apparatus 200, in the present embodiment, for example, a diffusion plate is disposed on the inner surface 212a of each lateral wall 212 to define a lateral diffusion region A, so that the light emitted by the side emitting type LEDs 230 after being incident on the diffusion plate can be uniformly diffused to the outside of the light mixing apparatus 300. Of course, in other embodiments, a coarsening process can also be applied directly to the surface according to the present invention, so that a lateral diffusion region A is defined on the inner surfaces 212a of the lateral walls 212, without limitation to the manners of forming the lateral diffusion region A.

It should be noted that the reflection structure 220 may expose the lateral diffusion region A, and the lateral diffusion region A is preferably positioned above the reflection structure 220. As such, the light L1 and the light L2 emitted by the side emitting type LEDs 230 are reflected several times between the lateral walls 212 of the reflection structure 220, and then diffused through the lateral diffusion region A above the reflection structure 220, thereby further causing the light emitted from the light mixing apparatus 200 more uniform. Of course, the present invention is not intended to limit the relative positions of the lateral diffusion region A and the reflection structure 220.

Furthermore, a diffusion plate can be disposed on the bottom plate 210 or the coarsening process can be applied to the surface of the bottom plate 210 according to the present invention in order to define a diffusion surface B on which the side emitting type LEDs 230 can be disposed. The diffusion surface B can uniformly diffuse the light emitted by the side emitting type LEDs 230 towards the bottom plate 210 to improve the utilization efficiency of the light emitted by the side emitting type LEDs 230. Moreover, in the light mixing apparatus 200 of the present invention, an upper diffusion plate C can be further disposed above the lateral walls 212, so that the light L1 and the light L2 can be reflected and diffused several times between the lateral walls 212, and then emitted from the upper diffusion plate C. As such, the uniformity of the light emitted by the light mixing apparatus 200 can be further promoted.

In the light mixing apparatus 200 of the present invention, the light is reflected several times within the light mixing apparatus 200 to extend the light traveling path within the light mixing apparatus 200, thereby achieving a uniformly light mixing effect. Therefore, the light mixing apparatus 200 of the present invention can improve the mixing uniformity of light without increasing the overall thickness of the light mixing apparatus 200.

Furthermore, it can be seen clearly from FIG. 3 that the light mixing apparatus 200 according to the present invention is symmetrically designed in structure. That is to say, the side emitting type LEDs 230 can be disposed at the center of the bottom plate 210, so that the light emitted by the side emitting type LEDs 230 (for example, light L1 and light L2) has symmetric traveling paths. As a result, the brightness of the overall light supplied by the light mixing apparatus 200 can be more uniform. Moreover, to meet the light-and-thin design trend of the back light module, the height of the lateral walls 212 of the light mixing apparatus 200 can be practically smaller than 0.6 times of the width of the bottom plate 210.

Second Embodiment

Figure 4:
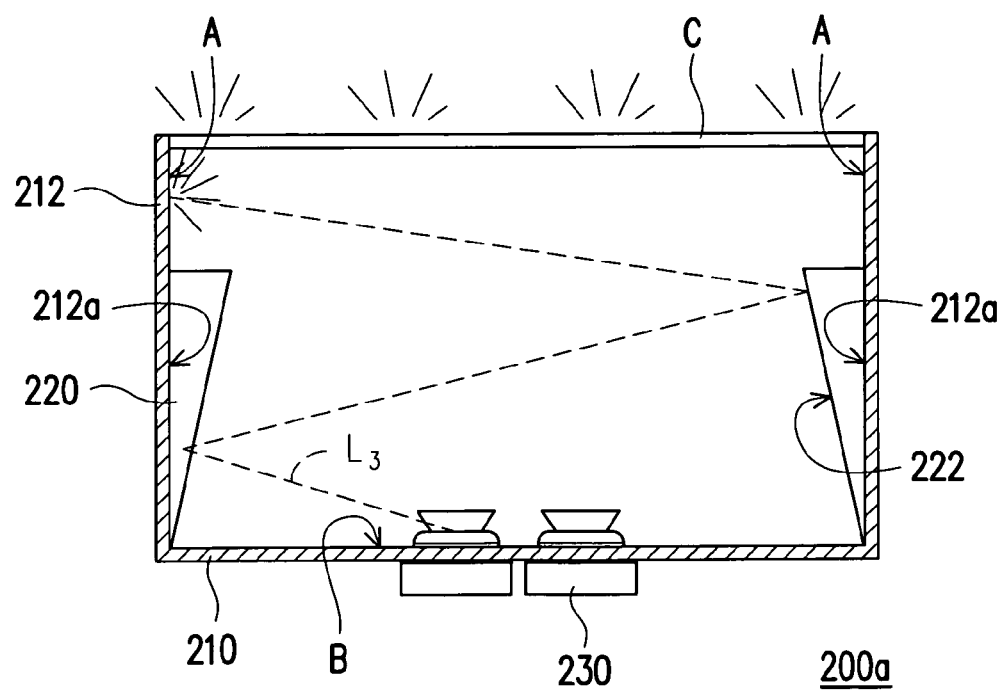
FIG. 4 depicts a schematic view of a light mixing apparatus according to the second embodiment of the present invention.

FIG. 4 depicts a schematic view of a light mixing apparatus according to the second embodiment of the present invention. Referring to FIG. 4, this embodiment is similar to the first embodiment, and their major difference is that the reflection structure 220 of the light mixing apparatus 200a according to the present embodiment is a wedge-shaped reflecting plate. The mirror 222 of the wedge-shaped reflecting plate can be angled from the lateral wall 212, and the light L3 can be reflected several times by the angled mirror 222 to extend the traveling path within the light mixing apparatus 200a, whereby the light provided by the light mixing apparatus 200a has a preferable uniformity.

Figure 5:
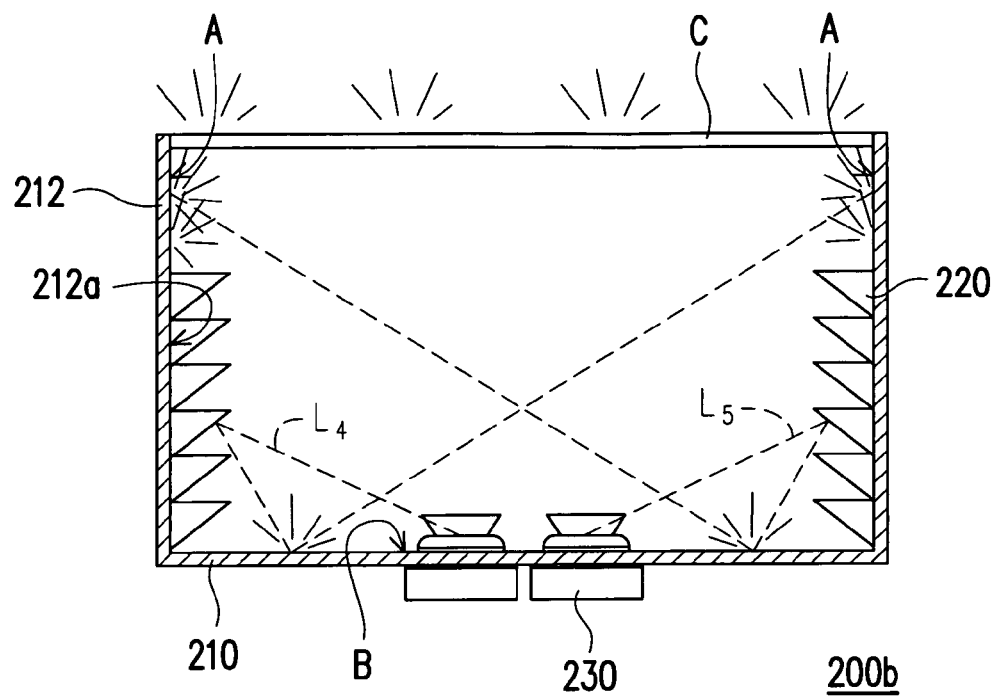
FIG. 5 depicts a schematic view of another light mixing apparatus according to the second embodiment of the present invention.

FIG. 5 depicts a schematic view of another light mixing apparatus according to the second embodiment of the present invention. It can be seen clearly from FIG. 5 that the reflection structure 220 of the light mixing apparatus 200b according to the embodiment is a plurality of micro-reflecting elements. These micro-reflecting elements can be formed by a plurality of micro lenses, and are suitable for reflecting the light (L4 and L5) back to the diffusion surface B of the bottom plate 210, and then reflecting the light (L4 and L5) to the lateral diffusion region A through the diffusion surface B. Thus, the light provided by the light mixing apparatus 200b can also have a preferable uniformity.

Third Embodiment

Figure 6:
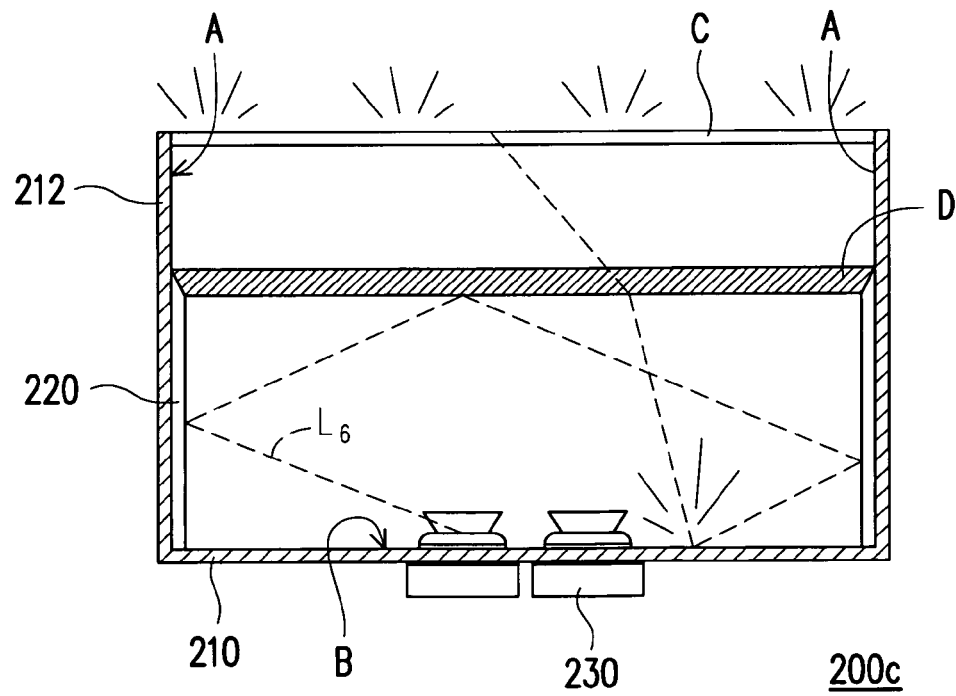
FIG. 6 depicts a schematic view of a light mixing apparatus according to the third embodiment of the present invention.

FIG. 6 depicts a schematic view of a light mixing apparatus according to the third embodiment of the present invention. Referring to FIG. 6, the major difference between this embodiment and the first embodiment is that the light mixing apparatus 200c of the present invention further includes a transparent refractive plate D disposed between the lateral walls 212 and above the side emitting type LEDs 230. The transparent refractive plate D is made of the material of high refractive index, for example, polymethyl methacrylate (PMMA). The light emitted by the side emitting type LEDs 230 (for example, light L6) can be transmitted repeatedly among the reflection structure 220, the transparent refractive plate D and the diffusion surface B, and finally emitted out by the transparent refractive plate D.

In detail, as the refractive index of the transparent refractive plate D is larger than that of air, the incidence angle of part of the light emitted by the side emitting type LEDs 230 (for example, L6) on the transparent refractive plate D is larger than the total reflection angle. The light L6 will be totally reflected on the surface of the transparent refractive plate D and transmitted repeatedly among the reflecting structure 220, the transparent refractive plate D and the diffusion surface B, till the light L6 enters the transparent refractive plate D in an angle smaller than the total reflection angle, and then sent out by the transparent refractive plate D. Accordingly, to dispose a transparent refractive plate D above the side emitting type LEDs 230 can extend the light traveling path within the light mixing apparatus 200c, thereby achieving a preferable uniformity of the light provided by the light mixing apparatus 200c.

Fourth Embodiment

Figure 7A:
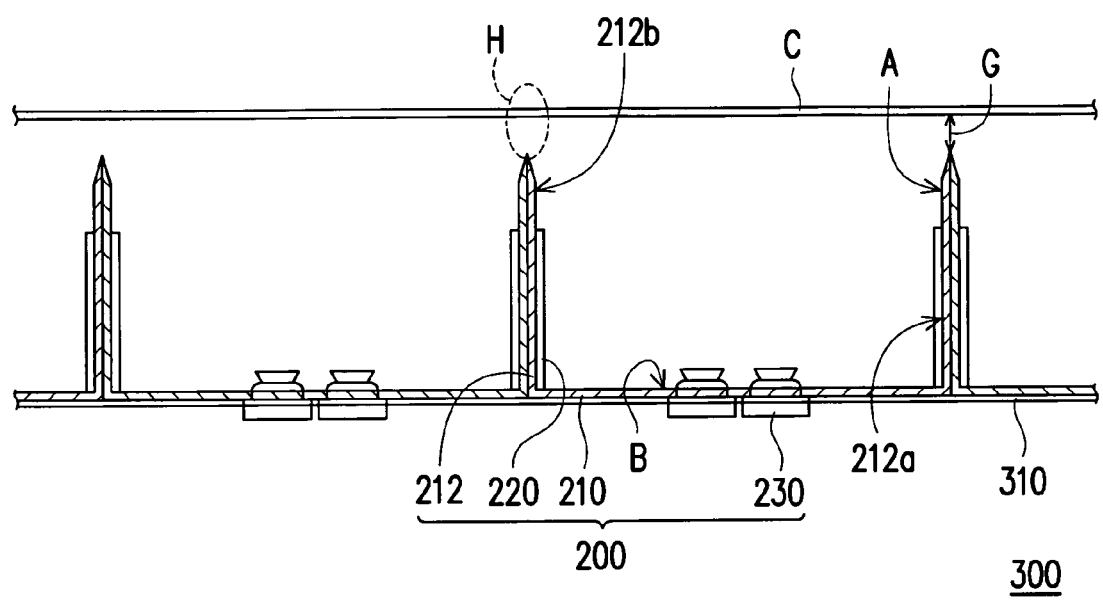
FIG. 7A depicts a partial schematic sectional view of a back light module according to the present invention.
Figure 7B:
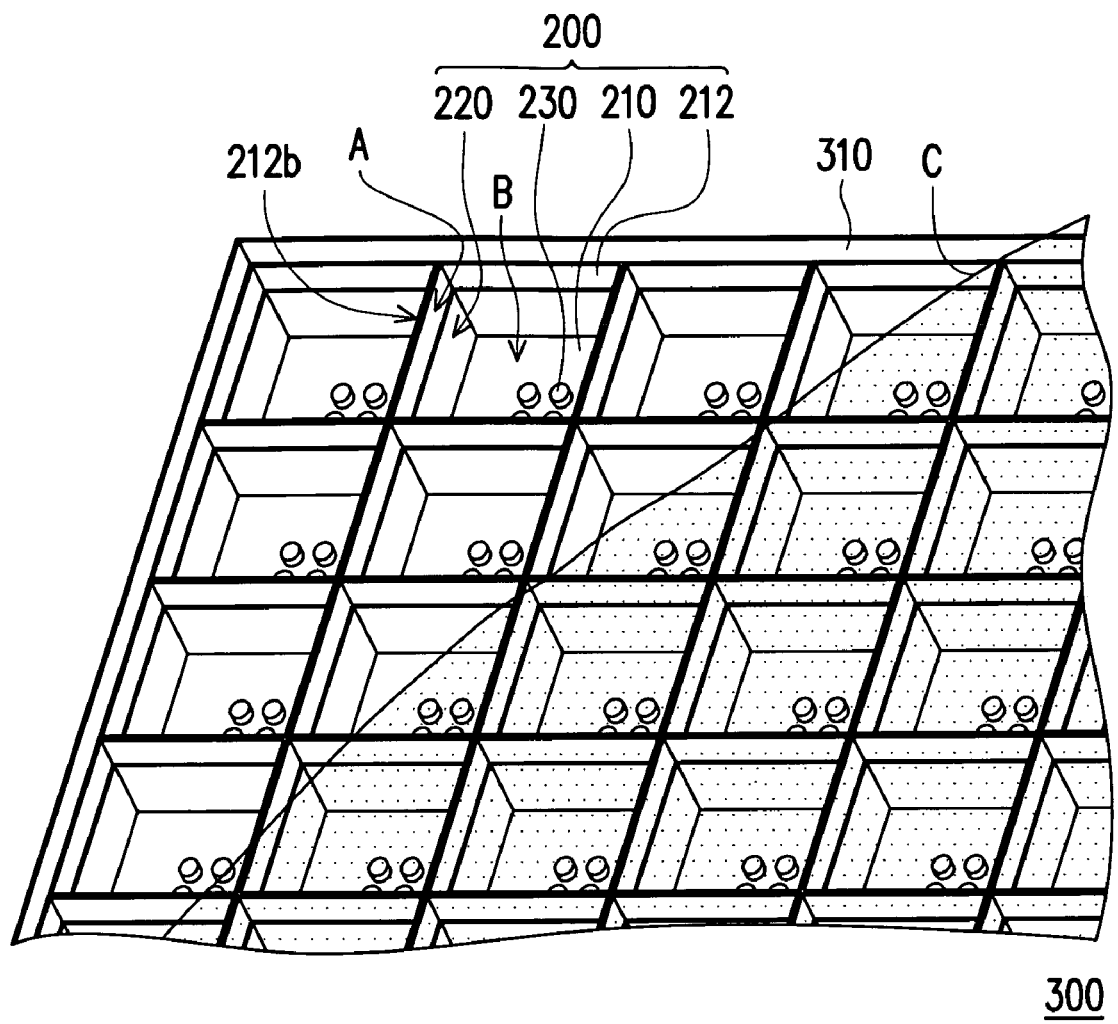
FIG. 7B depicts a partial schematic view of a back light module according to the present invention.

FIG. 7A depicts a partial schematic sectional view of a back light module according to the present invention, while FIG. 7B depicts a schematic spatial view of a back light module according to the present invention. Referring to FIG. 7A and FIG. 7B, the back light module 300 of the present invention includes an outer frame 310 and a plurality of light mixing apparatuses 200 of the first embodiment. The light mixing apparatuses 200 are arranged within the outer frame 310 in an array (as shown in FIG. 7B). Of course, the light mixing apparatus 200 can also employ the light mixing apparatus 200a of the second embodiment, the light mixing apparatus 200b of the third embodiment or the light mixing apparatus 200c of the fourth embodiment, without particular limitations here.

Because each light mixing apparatus 200 can provide uniformly mixed light, it does not suffer from the interference from the light emitted by other adjacent light mixing apparatuses 200. Compared with the prior art, a non-uniformly-mixed light will not happen even if the size of back light module 300 is large. Furthermore, each light mixing apparatus 200 of the present invention can emit uniformly-mixed light, so it has a higher flexibility in disposition. With the changes of the size of the back light module, the producers can accordingly dispose the proper number of light mixing apparatuses 200 within the outer frame 310.

It should be noted that in the back light module 300 of the present invention, the upper diffusion plate C can be separated from the upper edge of the lateral walls 212 by a distance G, and the diffusion plate C can be fixed on the outer frame 310, so that the dark line produced at the border H as the diffusion plate C is too close to the lateral walls 212 can be prevented. Moreover, the upper edge of each lateral wall 212 can be designed as a sharp portion 212b to further abate the problem of the occurrence of the dark line H at the border H.

In view of the above, the back light module and light mixing apparatus thereof according to the present invention at least have the following advantages:

First, as a reflection structure is disposed on the lateral walls in the light mixing apparatus according to the present invention, the light emitted by each side emitting type LED can be reflected several times within the light mixing apparatus, so that the light can be mixed uniformly without necessary to increase the overall thickness of the back light module.

Secondly, as the light mixing apparatus of the present invention can provide uniform light, there is no non-uniform light even at the edge of the back light module. Furthermore, regardless of the size of the back light module, the producers merely need to dispose the proper number of light mixing apparatuses on the bottom plate, without necessary to readjust the arrangement of the side emitting type LEDs according to the size of the back light module. Therefore, the light mixing apparatus of the present invention can be flexibly disposed and applied.

Thirdly, as the structure of the light mixing apparatus of the present invention is symmetrically designed in structure, the light emitted by the side emitting type LEDs have symmetric traveling paths. Accordingly, the overall light provided by the light mixing apparatus will have a more uniform brightness.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

What is claimed is:

1. A light mixing apparatus, comprising:
   a bottom plate;
   a plurality of lateral walls, connected to the bottom plate, each of the lateral walls being provided with an inner surface, and the inner surfaces facing each other, wherein the inner surface of each of the lateral walls has a lateral diffusion region;
   a reflection structure, disposed on the inner surfaces of the lateral walls, the reflection structure exposing the lateral diffusion regions and comprising at least a wedge-shaped reflecting plate, wherein the wedge-shaped reflecting plate has a bottom portion adjacent to the bottom plate and a top portion adjacent to the lateral diffusion regions, and the top portion is larger than the bottom portion; and
   a plurality of side emitting type LEDs, disposed on the bottom plate, wherein a majority of the light emitted from the LEDs is transmitted to the reflection structure and is reflected to the lateral diffusion regions of the lateral walls.

2. The light mixing apparatus according to claim 1, wherein the inner surface of each of the lateral walls has a lateral diffusion region and the reflection structure exposes the lateral diffusion regions.

3. The light mixing apparatus according to claim 2, wherein the lateral diffusion regions are positioned above the reflection structure.

4. The light mixing apparatus according to claim 1, wherein the bottom plate has a diffusion surface, and the side emitting type LEDs are disposed on the diffusion surface.

5. The light mixing apparatus according to claim 1, further comprises an upper diffusion plate disposed above the lateral walls.

6. The light mixing apparatus according to claim 5, wherein the upper diffusion plate and the upper edge of the lateral walls are separated by a pitch.

7. The light mixing apparatus according to claim 1, wherein the reflection structure comprises a plurality of micro-reflecting elements.

8. The light mixing apparatus according to claim 7, wherein the micro-reflecting elements comprise a plurality of micro lenses.

9. The light mixing apparatus according to claim 1, further comprises a transparent refractive plate disposed between the lateral walls and above the side emitting type LEDs, wherein the light emitted by the side emitting type LEDs is suitable to be reflected onto the transparent refractive plate by the reflection structure.

10. The light mixing apparatus according to claim 9, wherein the material of the transparent refractive plate is polymethyl methacrylate (PMMA).

11. The light mixing apparatus according to claim 1, wherein the upper edge of each of the lateral walls has a sharp portion.

12. The light mixing apparatus according to claim 1, wherein the side emitting type LEDs comprise red side emitting type LEDs, green side emitting type LEDs, blue side emitting type LEDs or any combination thereof.

13. A back light module, comprising:
    an outer frame;
    a plurality of light mixing apparatuses disposed within the outer frame, wherein each light mixing apparatus comprises:
      a bottom plate;
      a plurality of lateral walls, connected to the bottom plate, each of the lateral walls being provided with an inner surface, and the inner surfaces facing each other, wherein the inner surface of each of the lateral walls has a lateral diffusion region;
      a reflection structure disposed on the inner surfaces of the lateral walls, the reflection structure exposing the lateral diffusion regions and comprising at least a wedge-shaped reflecting plate, wherein the wedge-shaped reflecting plate has a bottom portion adjacent to the bottom plate and a top portion adjacent to the lateral diffusion regions, and the top portion is larger than the bottom portion; and
      a plurality of side emitting type LEDs disposed on the bottom plate, wherein a majority of the light emitted from the LEDs is transmitted to the reflection structure and is reflected to the lateral diffusion regions of the lateral walls.

14. The back light module according to claim 13, wherein the light mixing apparatuses are arranged within the outer frame in an array.

15. The back light module according to claim 13, wherein the inner surface of each of the lateral walls has a lateral diffusion region and the reflection structure exposes the lateral diffusion regions.

16. The back light module according to claim 15, wherein the lateral diffusion regions are positioned above the reflection structure.

17. The back light module according to claim 13, wherein the bottom plate has a diffusion surface and the side emitting type LEDs are disposed on the diffusion surface.

18. The back light module according to claim 13, further comprises an upper diffusion plate disposed above the lateral walls.

19. The back light module according to claim 18, wherein the upper diffusion plate and the upper edge of the lateral walls are separated by a pitch.

20. The back light module as claimed in claim 13, wherein the reflection structure comprises a plurality of micro-reflecting elements.

21. The back light module according to claim 20, wherein the micro-reflecting elements comprise a plurality of micro lenses.

22. The back light module according to claim 13, further comprising a plurality of transparent refractive plates disposed between the lateral walls and above the side emitting type LEDs, wherein the light emitted by the side emitting type LEDs is suitable to be reflected onto the transparent refractive plates by the reflection structure.

23. The back light module according to claim 22, wherein the material of the transparent refractive plates is polymethyl methacrylate (PMMA).

24. The back light module according to claim 13, wherein the upper edge of each of the lateral walls is provided with a sharp portion.

25. The back light module according to claim 13, wherein the side emitting type LEDs comprise red side emitting type LEDs, green side emitting type LEDs, blue side emitting type LEDs or any combination thereof.

* * * * *